(12) United States Patent
Alberer et al.

(10) Patent No.: US 11,660,483 B2
(45) Date of Patent: May 30, 2023

(54) SENSOR-BASED FIRE DETECTION IN A FLUID CONDUIT

(71) Applicant: Bayerische Motoren Werke Aktiengesellschaft, Munich (DE)

(72) Inventors: Daniel Alberer, Sankt Florian (AT); Andreas Kerschbaummayr, Garsten (AT); Andreas Leyrer, Steyregg (AT); Bernhard Ramsebner, Ried im Traunkreis (AT); Martin Ranzmaier, Wilhering (AT); Dietmar Schroeder, Schlierbach (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/704,427

(22) Filed: Mar. 25, 2022

(65) Prior Publication Data

US 2022/0305317 A1    Sep. 29, 2022

(30) Foreign Application Priority Data

Mar. 26, 2021   (DE) .................. 10 2021 107 622.6

(51) Int. Cl.
| | |
|---|---|
| *F02B 77/08* | (2006.01) |
| *A62C 3/00* | (2006.01) |
| *A62C 3/07* | (2006.01) |
| *A62C 37/40* | (2006.01) |
| *A62C 99/00* | (2010.01) |

(Continued)

(52) U.S. Cl.
CPC ................ *A62C 37/40* (2013.01); *A62C 3/00* (2013.01); *A62C 37/36* (2013.01); *A62C 37/38* (2013.01); *A62C 37/44* (2013.01); *A62C 99/0018* (2013.01); *B60Q 9/00* (2013.01); *F02B 77/08* (2013.01); *F02B 77/10* (2013.01);
(Continued)

(58) Field of Classification Search
CPC .. A62C 3/00; A62C 3/07; A62C 37/36; A62C 37/38; A62C 37/40; A62C 37/44; F02B 77/08; F02B 77/10
USPC ............... 123/198 D; 169/11, 12, 60, 61, 62
See application file for complete search history.

(56) References Cited

U.S. PATENT DOCUMENTS

| | | | | |
|---|---|---|---|---|
| 3,754,602 A | * | 8/1973 | Magdars ................. | A62C 3/10 169/42 |
| 4,201,178 A | * | 5/1980 | Tyrer ..................... | F02B 77/10 123/198 D |

(Continued)

FOREIGN PATENT DOCUMENTS

| | | |
|---|---|---|
| DE | 43 27 066 A1 | 2/1995 |
| DE | 40 28 131 C2 | 6/2001 |

(Continued)

OTHER PUBLICATIONS

German-language Office Action issued in German Application No. 10 2021 107 622.6 dated Oct. 13, 2021 (four (4) pages).

(Continued)

*Primary Examiner* — Erick R Solis
(74) *Attorney, Agent, or Firm* — Crowell & Moring LLP

(57) ABSTRACT

A controller for a motor vehicle having an internal combustion engine, and a device for detecting a fire in a fluid conduit, the device having a fluid state sensor for detecting a state variable of a fluid that is conducted in the fluid conduit, are provided. The determination of a fire situation is performed in a manner dependent on a signal of the fluid state sensor.

15 Claims, 3 Drawing Sheets

(51) Int. Cl.
*B60Q 9/00* (2006.01)
*F02D 35/00* (2006.01)
*F02D 41/00* (2006.01)
*F02D 41/22* (2006.01)
*F02M 35/10* (2006.01)
*A62C 37/36* (2006.01)
*A62C 37/44* (2006.01)
*A62C 37/38* (2006.01)
*F02B 77/10* (2006.01)

(52) U.S. Cl.
CPC ............ *F02D 35/00* (2013.01); *F02D 41/005* (2013.01); *F02D 41/22* (2013.01); *F02M 35/10373* (2013.01)

(56) References Cited

U.S. PATENT DOCUMENTS

| | | | | |
|---|---|---|---|---|
| 4,338,896 | A | * | 7/1982 | Papasideris ............. F02B 77/08 123/198 DB |
| 4,499,733 | A | * | 2/1985 | Farr ........................ F02D 17/04 60/611 |
| 5,144,927 | A | | 9/1992 | Denz |
| 2013/0250729 | A1 | * | 9/2013 | Park ........................ G01S 15/88 367/87 |
| 2020/0188718 | A1 | * | 6/2020 | Trivelpiece ............ A62C 37/36 |

FOREIGN PATENT DOCUMENTS

| | | | | |
|---|---|---|---|---|
| DE | 699 15 570 T2 | | 2/2005 | |
| DE | 10 2005 029 339 A1 | | 1/2007 | |
| JP | 03189331 A | * | 8/1991 | ............ F02B 77/08 |
| WO | WO-2008122756 A1 | * | 10/2008 | ............ F01M 1/16 |
| WO | WO-2018224654 A1 | * | 12/2018 | ............ F02B 39/16 |

OTHER PUBLICATIONS

German-language Search Report issued in German Application No. 10 2021 107 622.6 dated Oct. 13, 2021 with partial English translation (10 pages).

* cited by examiner

SENSOR-BASED FIRE DETECTION IN A FLUID CONDUIT

CROSS REFERENCE TO RELATED APPLICATION

This application claims priority under 35 U.S.C. § 119 from German Patent Application No. DE 10 2021 107 622.6, filed Mar. 26, 2021, the entire disclosure of which is herein expressly incorporated by reference.

BACKGROUND AND SUMMARY OF THE INVENTION

The invention relates to a device with a fluid state sensor and to a controller for detecting a fire in a fluid conduit, in particular in an intake system of an internal combustion engine or of a combustion-type work machine.

The invention is described primarily in the context of an intake system of an internal combustion engine in a motor vehicle, but is also applicable to any other fluid conduits in which it is sought to detect a fire of the conducted fluid or of components of the fluid.

Under conditions that arise very rarely during vehicle operation, a fire can occur in the intake system. These conditions include in particular intense soot contamination of the intake system, for example with deposits of recirculated exhaust gases. A resulting local fire event can develop into a fire of the entire vehicle, which must be prevented under all circumstances.

Fires in the intake system are commonly detected on the basis of sensors by virtue of a state variable of the fluid—for example a fluid temperature—being measured and compared with a limit value, beyond which a fire is assumed to be present. This consideration of a limit value may also be dependent on the operating state.

Such consideration of a limit value may however result in a delayed triggering of the detection, because countermeasures are implemented only when the limit value is exceeded.

An early detection of the fire event in the fluid conduit is, however, important in order to be able to implement suitable countermeasures in good time, which countermeasures counteract the fire and/or at least limit the impact thereof. Possible countermeasures are more effective the earlier they are implemented in the fire event.

Against this background, it is an object of the invention to improve fire detection in a fluid conduit.

Said object is achieved by way of the claimed invention.

According to one aspect, a device for detecting a fire in a fluid conduit, in particular in an intake system of an internal combustion engine or of a combustion work machine, is disclosed. The device has a fluid state sensor for detecting a state variable of a fluid that is conducted in the fluid conduit.

The determination of a fire situation is performed in a manner dependent on a noise signal of the fluid state sensor during the detection of the state variable. In particular, the fire detection is performed not or not exclusively on the basis of the useful signal from which measured values for the fluid state variable to be measured are ascertained, but rather only or also on the basis of an interference signal that is superposed on said useful signal.

In this way, using a sensor arrangement that is present in the fluid conduit in any case, fast and reliable fire detection can be implemented on the basis on the findings of the inventors that the flickering of a fire in the fluid generates a noise signal with regard to various state variables, which can be detected using existing sensors.

In particular, this flickering generates a variation of the signal around the characteristic form of the detected fluid state variable, which variation exhibits frequencies which vary and/or are superposed over time.

According to a further aspect, a controller is disclosed which is configured in particular in an engine control unit for a motor vehicle with an internal combustion engine, and which in particular has a device according to an embodiment of the invention. The faster fire detection can thus be implemented for an internal combustion engine.

The invention is based inter alia on findings of the inventors, who identified, in tests, that various sensors in the air system (in particular the fresh-air mass sensor, the charge pressure sensor and the exhaust-gas counterpressure sensor) exhibited an intense noise signal when a fire was present in the intake system. The commonly high-frequency noise power that was discovered here differs greatly in intensity from a signal pattern in the case of a normal functional state of the intake system.

The invention is now based inter alia on the concept of taking the difference between the signal pattern with and (at least substantially) without a noise signal into consideration as a variable for deciding on whether a fire is present. If a fire is detected in this way, then it is possible, in one embodiment, to directly attempt to extinguish the fire using suitable countermeasures (for example by flooding the intake system with EGR).

In one embodiment, the device is configured to perform the determination of a fire situation in a manner dependent on a noise power of the noise signal. In this way, the fire can be detected in a manner dependent on an intensity of the noise signal, which in turn may be dependent on the intensity of the fire event.

In one embodiment, the device is configured to determine a fire situation if—in particular as soon as and/or for as long as—an ascertained noise power of the fluid state sensor exceeds a limit value. This makes it possible to assign the fire situation to the signal pattern if it can be assumed with sufficient certainty that the noise signal measured during the operation of the fluid conduit, in particular of the vehicle, can be caused only by a fire in the fluid conduit.

According to one embodiment, the device is configured to determine a fire situation if—in particular as soon as and/or for as long as—an ascertained noise power of two or more fluid state sensors exceeds an in particular respective limit value. In this way, the (positive) confidence in the detection of the fire situation can be further improved.

According to one embodiment, the device is configured to determine a fire situation if—in particular as soon as and/or for as long as—one or more further fire indicators ascertained independently of the noise power are present. Such a fire indicator may for example be:

a) a temperature gradient, in particular a fluid temperature gradient, in the fluid conduit that is higher than a gradient limit value that is representative of a fire.

b) a temperature value, in particular a fluid temperature value, in the fluid conduit that is higher than a temperature limit value that is representative of a fire.

c) a combustion ratio difference, in particular between a combustion ratio in the fluid conduit ascertained in model-based fashion and a measured combustion ratio in the fluid conduit, that is higher than a difference limit value that is representative of a fire.

The (positive) confidence in the detection of the fire situation can thus be yet further improved.

According to one embodiment, the device is configured to take the noise power into consideration with a weighting with respect to the underlying signal frequency for the purposes of the fire detection. In this way, noise signals to which no known cause from the operation of the fluid conduit, in particular of the intake system of the internal combustion engine, can be assigned can be taken more strongly or exclusively into consideration.

According to one embodiment, the device is configured to ascertain the noise power for the purposes of the fire detection more strongly or exclusively on the basis of signal frequencies outside an engine frequency spectrum, in particular outside the crankshaft frequency and the harmonics thereof. In this way, signal changes owing to the engine dynamics (as a strong driver of a signal change) can remain disregarded, or taken into consideration only to a desired degree, in the fire detection in the fluid conduit, in particular in the intake system.

According to one embodiment, the device is configured to perform the fire detection in a manner dependent on the, in particular respective, noise signal of one or more of the following fluid state sensors, which may be provided in particular as part of the device in and/or on the fluid conduit: fresh-air mass sensor, charge pressure sensor, exhaust-gas counterpressure sensor.

According to one embodiment, the device has a monitoring evaluation device for evaluating detected signals of the fluid state sensor, which monitoring evaluation device is configured to activate at least one countermeasure if a fire (event) is detected. Here, countermeasures may for example be: a shut-off of a fuel supply, and/or a flooding of the fluid conduit with inert gas, in particular an EGR gas, and/or a warning to a user of the fluid conduit, in particular a vehicle driver, by way of a visual, acoustic and/or other expedient warning message.

This makes possible an earlier and thus damage-minimizing reaction, in particular with stepped escalation, to the detected fire during the operation of the fluid conduit, in particular of the vehicle.

Further advantages and possible uses of the invention will become apparent from the following description in conjunction with the figures.

DETAILED DESCRIPTION OF THE DRAWINGS

Figure 1:
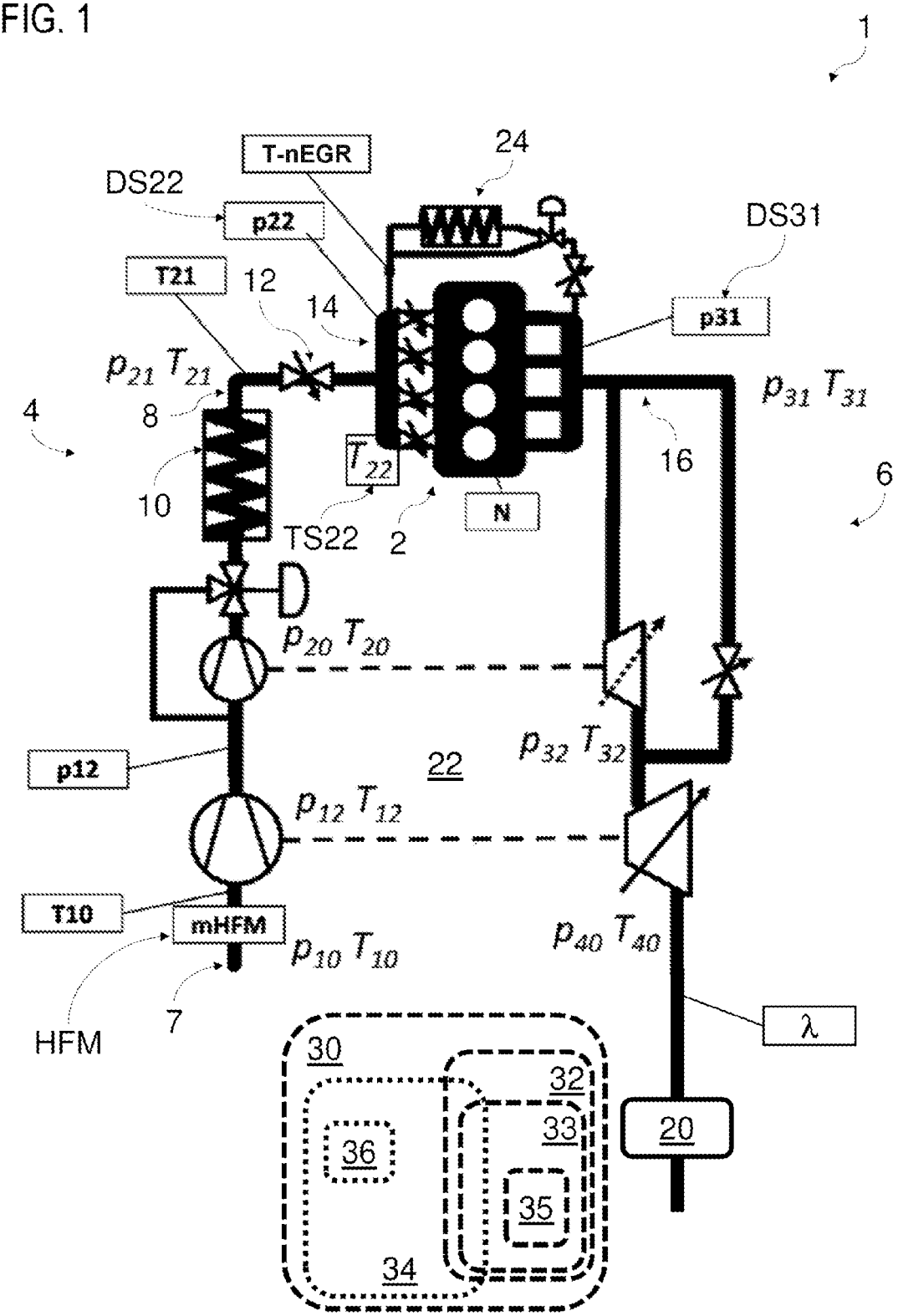
FIG. 1 schematically shows a vehicle drive with an internal combustion engine and with a controller with a device for fire detection according to an exemplary embodiment of the invention.

FIG. 1 shows a vehicle drive 1 having an internal combustion engine 2. The internal combustion engine 2 is, in the exemplary embodiment, configured as a four-cylinder diesel engine. The internal combustion engine 2 is connected, for the supply of oxygen, to a fluid conduit 4 in the form of an intake system and, for the purification of the exhaust gases, to an exhaust-gas system 6.

The intake system 4 has a fresh-air conduit 8, a charge-air cooler 10, a throttle flap 12 and an air manifold 14.

Along an exhaust-gas conduit 16, the exhaust-gas system 6 has an exhaust-gas manifold 18 and an exhaust-gas aftertreatment device 20. The exhaust-gas aftertreatment device 20 has at least one three-way catalytic converter, and in particular also further aftertreatment devices such as at least one particle filter and/or at least one SCR catalytic converter.

To increase the performance of the internal combustion engine 2, a two-stage exhaust-gas turbocharger 22 is arranged in the fresh-air conduit 8 of the intake system 4 and in the exhaust-gas conduit 16 of the exhaust-gas system 6. The compressors of the exhaust-gas turbocharger 22 are arranged in the fresh-air conduit 8, and the turbines of the exhaust-gas turbocharger 22 are arranged in the exhaust-gas conduit 16.

In the exemplary embodiment, the high-pressure compressor and the high-pressure turbine of the exhaust-gas turbocharger 22 are configured such that they can each be bypassed by way of a switchable bypass.

The intake system 4 and the exhaust-gas system 6 are connectable by way of a switchable high-pressure exhaust-gas recirculation line (HP-EGR line) 24, such that hot exhaust gas can be conducted from the exhaust-gas manifold 17 into the air manifold 14 and mixed there with fresh air from the fresh-air conduit 8 and/or in the air manifold 14. In the exemplary embodiment, the exhaust gases in the EGR line 24 can be switchably conducted through and/or past an EGR cooler.

The fluid in the air manifold 14 normally has fresh air that has been supplied through the throttle flap 12, and optionally EGR gas from the HP-EGR line and/or former cylinder charge that has been able to pass from the cylinder back into the air manifold 14 owing to the pressure conditions.

The vehicle drive has various fluid state sensors HFM, TS22, DS22, DS31 (and others), the function and position of which in the fluid conduit will be described below:

(a) Hot film air mass sensor HFM: a hot film air mass sensor HFM is arranged at a fresh-air inlet 7 of the fresh-air conduit 8 for the purposes of measuring an air mass flow mHFM and a temperature sensor for measuring a fresh-air temperature T10.

(b) Compressor sensor: a pressure sensor for measuring a compressor pressure pia in the fresh-air conduit is arranged between the two compressors 8.

(c) Pre-throttle temperature sensor: a temperature sensor for measuring a pre-throttle temperature $T_{21}$ in the fresh-air conduit is arranged between the charge-air cooler 10 and the throttle flap 12.

(d) Charge pressure sensor DS22: a pressure sensor DS22 for measuring a charge pressure $p_{22}$ is arranged in the air manifold 14.

(e) Inlet temperature sensor TS22: a temperature sensor TS22 for measuring an air manifold temperature $T_{22}$ is arranged in the air manifold 14 and/or upstream of the inlet valves of the respective cylinder in the charge-gas flow.

(f) EGR temperature sensor: a temperature sensor for measuring an EGR mixture temperature T-nEGR at the inlet into the air manifold 14 is arranged in the EGR line 24.

(g) Exhaust-gas counterpressure sensor DS31: a pressure sensor DS31 for measuring an exhaust-gas counterpressure $p_{31}$ is arranged in the exhaust-gas manifold 17.

(h) A lambda probe 26 for measuring a mixture composition of the exhaust gases upstream of the inlet into the exhaust-gas aftertreatment arrangement 20 is arranged between the low-pressure turbine of the exhaust-gas turbocharger 22 and the exhaust-gas aftertreatment arrangement 20.

The vehicle drive 1 furthermore has an engine control unit 30 which is configured to control the vehicle drive with all of its components in accordance with the operating requirements of the motor vehicle. The engine control unit 30 is also configured, for optimum control of the vehicle drive and its components, to take into consideration measured values from all of the abovementioned sensors, and to use conventional operation models, lookup tables etc., optionally using the detected and/or processed sensor values.

The engine controller 30 has a controller 32 that may perform control, detection and determining. The controller 32 has a device 33 for detecting a fire in the intake system 4. The fire detection device 33 has a monitoring evaluation device 35 for monitoring detected signals of the fluid state sensors HFM, TS22, DS22, DS31. The monitoring evaluation device 35 is configured to implement one or more countermeasures, in this case at least a flooding of the fluid conduit with (at least substantially inert) EGR gas and/or a warning to the vehicle driver by way of a suitable warning signal, if a fire situation is detected.

The device 33 is configured to perform the determination of a fire situation B in the intake system 4, and in this case in particular in the air manifold 14, in a manner dependent on a respective noise signal $R_{HFM}$, $R_{TS22}$, $R_{DS22}$, $R_{DS31}$ of one or more fluid state sensors HFM, TS22, DS22, DS31 during the detection of the state variable.

With the sensors that are installed in any case, fire detection can be implemented with little delay through interpretation of the noise signal R, in this case by the determination of the fire situation B being performed in a manner dependent on a noise power $P_R$ of the noise signal. The fire situation B is determined if the ascertained noise power $P_R$ of the fluid state sensor exceeds a limit value $P_{G,R}$. The limit value may differ for each of the fluid state sensors and is dimensioned such that a fire situation is to be attributed if it can be assumed with sufficient certainty that the measured noise power $P_R$ during the operation of the vehicle drive 1 can be caused only by a fire in the fluid conduit. The limit values may be dependent on the (engine) operating state. In the exemplary embodiment, suitable limit values have been determined during the development of the vehicle in tests and/or on the basis of models.

The device has a decision logic facility that stipulates what requirements must be met in order for a fire situation B to be determined. Depending on the application, a fire situation B may be determined simply in the event of an overshooting of the limit value $P_{G,R}$ at one of the fluid state sensors, in particular if this exceedance is associated with sufficient confidence to justify the consequences of the countermeasures that are thereby triggered. In the present case, provision is made for the fire situation to be determined only in the event of an exceedance of the limit value $P_{G,R}$ at two or more of the fluid state sensors, in order to avoid false positive fire situations.

In the present case, a filtered noise power variable is evaluated in which the signal frequencies of an engine frequency spectrum of the internal combustion engine 2, that is to say of the crankshaft frequency thereof and the associated harmonics, are provided with a relatively low weighting or are filtered out entirely.

The number and identity of the fluid state sensors at which a limit value must be overshot in order to determine the fire situation may also be dependent on the (engine) operating state, in particular with regard to load situation, demanded torque and present rotational speed.

In the decision logic facility, provision may also be made for a fire situation to be determined only if a further fire indicator ascertained independently of the noise power is additionally present: a cylinder inlet temperature (and/or the rate of change thereof) that is higher than a temperature limit value that is representative of a fire.

In addition or alternatively, as a fire indicator ascertained independently of the noise power, use may be made of a combustion ratio difference between a combustion ratio in the fluid conduit ascertained in model-based fashion and a measured combustion ratio in the fluid conduit, which difference is higher than a difference limit value that is representative of a fire.

To perform these tasks, the engine control unit 30 and/or the controller 32 is additionally configured to make use, in the context of an embodiment of the invention, of operation models 34 of the vehicle, of the vehicle drive and/or of the at least one drive engine that are typically stored in motor vehicles, that is to say in particular of data, sensor values, lookup tables 36 and/or model predictions that are accessible in motor vehicles.

For the exemplary operating situation of the vehicle drive 1 illustrated on the basis of the sensor signals in FIGS. 2a-2c, FIG. 3 illustrates an exemplary flow diagram of the information processing and decision steps during fire detection by the controller 32 from FIG. 1.

Figure 2A:
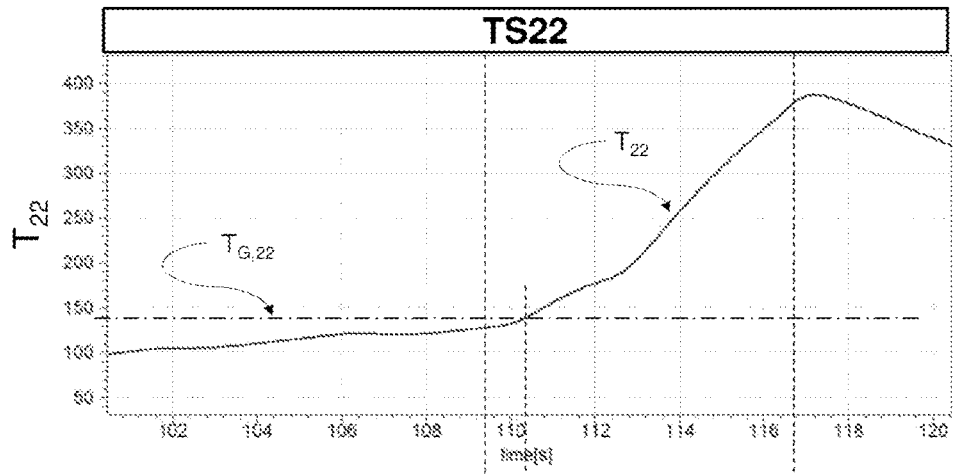
FIGS. 2a-2c show in each case a detected signal and a noise power of different fluid state sensors of the vehicle drive from FIG. 1, plotted versus time.
Figure 2B:
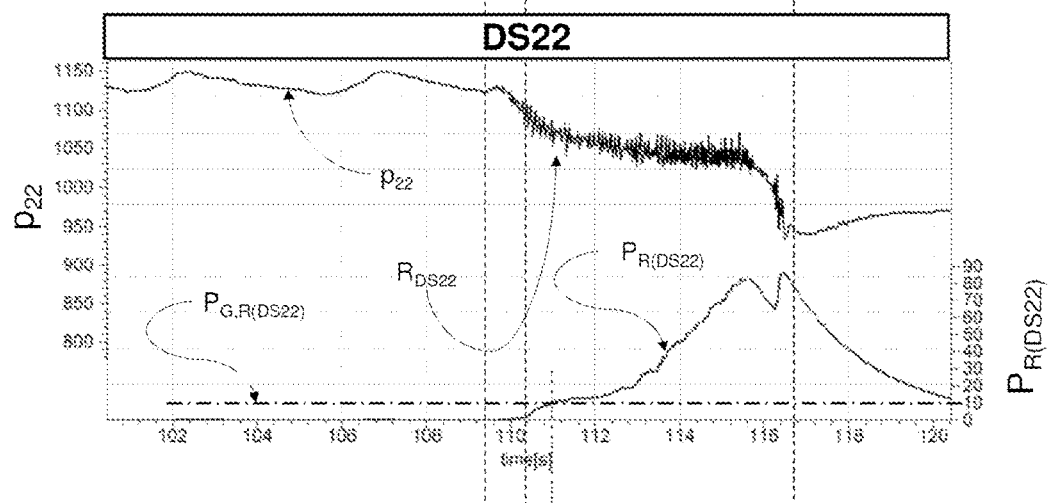
Figure 2C:
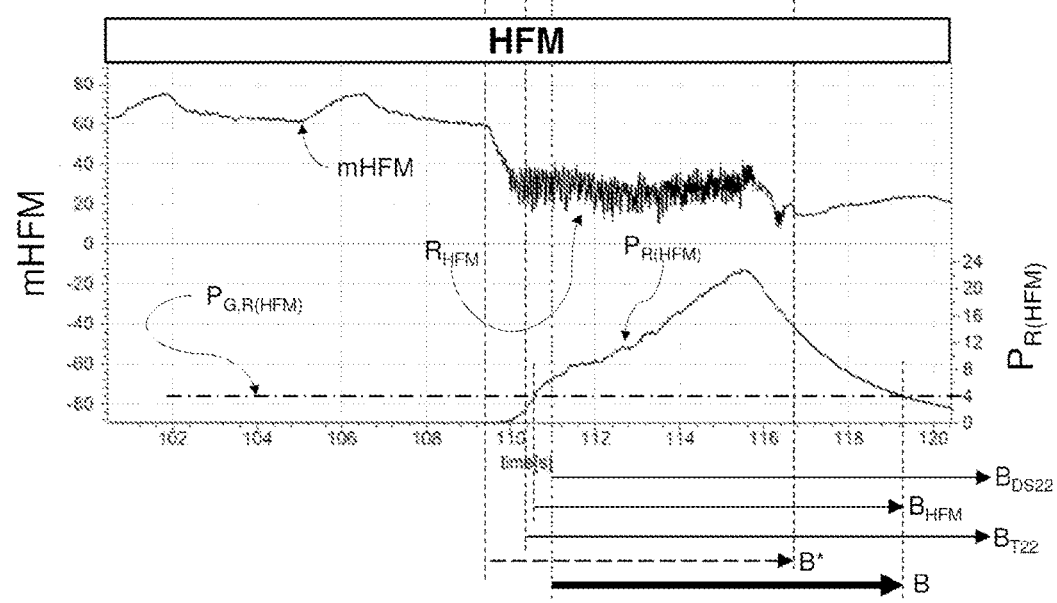
Figure 3:
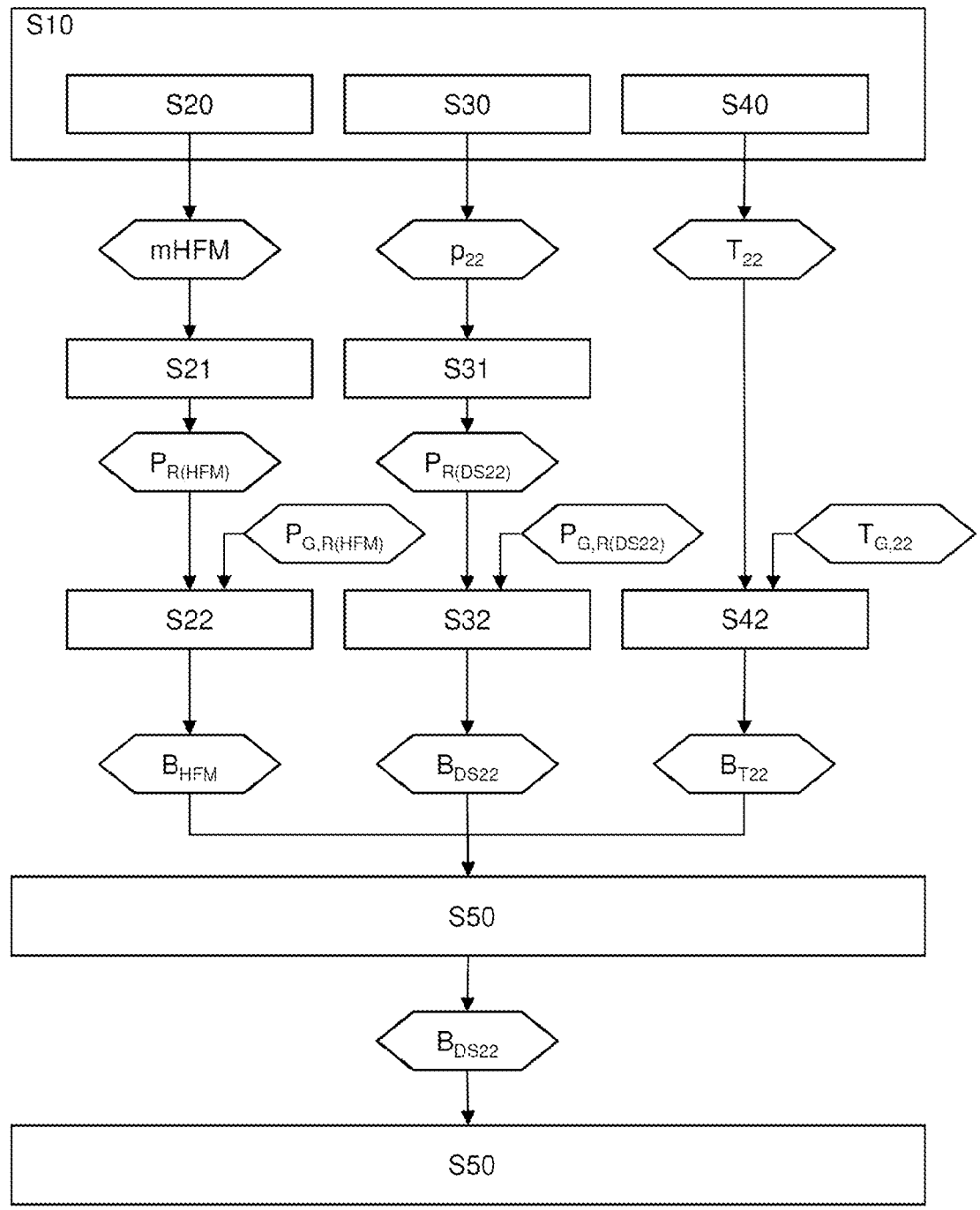
FIG. 3 shows a flow diagram of fire detection using the controller from FIG. 1.

FIGS. 2a-2c show the detected signals mHFM of the fresh-air mass sensor HFM (FIG. 2a), $p_{22}$ of the charge-pressure sensor DS22 and $T_{22}$ of the inlet temperature sensor TS22, in each case over the same time segment. It can be seen that, between the time codes 109s and 110s, the values of the inlet temperature $T_{22}$ increase, and the signals $p_{22}$ of the sensor DS22 for the charge pressure and mHFM of the sensor HFM for the fresh air exhibit high-frequency variants with irregular oscillation.

This is based on a fire event that starts after the time code 109s. In order to detect this fire event during vehicle operation at an early point in time and in a reliable manner (and initiate countermeasures if necessary), the following method steps are performed in the controller 32:

S10: during the operation of the vehicle drive 1, the signals of all fluid state sensors of the vehicle drive 1 are basically detected and analyzed continuously. By way of example, the fire detection in an exemplary application of the invention will be discussed here on the basis of the detected signals of the fresh-air mass sensor HFM, of the charge pressure sensor DS22 and of the inlet temperature sensor TS22.

S20: Here, the signal mHFM of the fresh-air mass sensor HFM is detected (cf. FIG. 2c).

S21: The detected signal mHFM is analyzed: a filtered noise power $P_{R(HFM)}$ of the signal mHFM is determined. In the determination of the noise power, the engine frequency spectrum is filtered out in order that the ascertained noise power provides information only regarding the "unexplained" components of the noise signal.

S22: Comparison of the filtered noise power $P_{R(HFM)}$ with a limit value $P_{G,R(HFM)}$ that is stored in the controller 32. If the limit value is exceeded, a flag $B_{HFM}$ is set. The set flag indicates that the noise signal of the sensor HFM represents a current fire event.

S30: Here, the signal $p_{22}$ of the charge pressure sensor DS22 is detected (cf. FIG. 2b).

S31: The detected signal $p_{22}$ is analyzed: a filtered noise power $P_{R(p22)}$ of the signal $p_{22}$ is determined. In the determination of the noise power, the engine frequency spectrum is filtered out in order that the ascertained noise power provides information only regarding the "unexplained" components of the noise signal.

S32: Comparison of the filtered noise power $P_{R(DS22)}$ with a limit value $P_{G,R(DS22)}$ that is stored in the controller 32. If the limit value is exceeded, a flag $B_{DS22}$ is set. The set flag indicates that the noise signal of the sensor DS22 represents a current fire event.

S40: Here, the signal $T_{22}$ of the inlet temperature sensor TS22 is detected (cf. FIG. 2a). By contrast to the two other sensor signals, the sensor $T_{22}$ of the temperature sensor TS22 is evaluated not with regard to the noise signal contained therein but purely with regard to the useful signal, in this case the measured temperature.

S42: Comparison of the ascertained temperature $T_{22}$ with a limit value $T_{G,22}$ that is stored in the controller 32. If the limit value is exceeded, a flag $B_{TS22}$ is set. The set flag indicates that the noise signal of the sensor $T_{22}$ represents a current fire event.

S50: Comparison of the set flag with flag combinations that are stored in the controller 32. In the present case, a fire situation B is determined if all three flags are set. Depending on the application, the fire situation B is determined only after a predetermined threshold time, during which updates of the measurements must continue to result in set flags.

S60: If the fire situation B is determined, countermeasures are implemented. In the exemplary embodiment, the air manifold 14 is flooded with EGR gas by the controller 32 by virtue of the EGR valve being opened to a maximum extent.

LIST OF REFERENCE DESIGNATIONS

1 Vehicle drive
2 Internal combustion engine
4 Intake system
6 Exhaust system
7 Air inlet
8 Fresh-air conduit
10 Charge-air cooler
12 Throttle flap
14 Air manifold
16 Exhaust-gas conduit
20 Exhaust-gas after treatment arrangement
22 Exhaust-gas turbocharger
24 High-pressure EGR line
30 Engine control unit (symbolically illustrated)
32 Controller (symbolically illustrated)
33 Device for fire detection
34 Operating models (symbolically illustrated)
35 Monitoring evaluation device
36 Lookup tables (symbolically illustrated)
S10-S60 Method steps
B* Real fire event
B Fire situation
$B_{HFM}$ Flag for fire situation from signal of the HFM
$B_{DS22}$ Flag for fire situation from signal of the HDS22
$B_{TS22}$ Flag for fire situation from signal of the TS22
DS22 Charge-pressure sensor
D S31 Exhaust-gas counterpressure sensor
HFM Hot film air mass sensor
mHFM Fresh-air mass flow
PR Noise power
$P_R$ Noise power
$P_{R,G}$ Noise power limit value
p Pressure
$p_{12}$ Compressor pressure
$p_{22}$ Charge pressure
$p_{31}$ Exhaust-gas counterpressure
R Noise signal
$R_{HFM}$ Noise signal of the hot film air mass sensor
$R_{TS22}$ Noise signal of the inlet temperature sensor
$R_{DS22}$ Noise signal of the charge pressure sensor
RB Normal operation
t Time
T Temperature
$T_{10}$ Fresh-air temperature
$T_{21}$ Pre throttle temperature
$T_{22}$ Inlet temperature
$T_{G,22}$ Limit value of the inlet temperature
T-nEGR EGR mixture temperature
TS22 Inlet temperature sensor
λ Fuel-air ratio

What is claimed is:

1. A device for detecting a fire in a fluid conduit, the device comprising:
   a fluid state sensor for detecting a state variable of a fluid that is conducted in the fluid conduit,
   wherein the device is configured to perform a determination of a fire situation in a manner dependent on a noise signal of the fluid state sensor.

2. The device according to claim 1, wherein the device is further configured to perform the determination of the fire situation in a manner dependent on a noise power of the noise signal.

3. The device according to claim 1, wherein the device is further configured to determine that the fire situation exists if an ascertained noise power of the fluid state sensor exceeds a limit value.

4. The device according to claim 1, wherein the device is further configured to determine that the fire situation exists if an ascertained noise power of each of two or more fluid state sensors exceeds a respective limit value.

5. The device according to claim 3, wherein the device is further configured to determine that the fire situation exists if one or more further fire indicators ascertained independently of the noise power are present.

6. The device according to claim 5, wherein the one or more further fire indicators comprise at least one of:
   a temperature gradient in the fluid conduit that is higher than a gradient limit value that is representative of a fire,
   a temperature value in the fluid conduit that is higher than a temperature limit value that is representative of a fire, or
   a combustion ratio difference that is higher than a difference limit value that is representative of a fire.

7. The device according to claim 6, wherein the combustion ratio difference is between a combustion ratio in the fluid conduit ascertained in model-based fashion and a measured combustion ratio in the fluid conduit.

8. The device according to claim 2, wherein the device is further configured to take the noise power into consideration with a weighting with respect to an underlying signal frequency for the determination of the fire situation.

9. The device according to claim 3, wherein the device is further configured to ascertain the noise power for the determination of the fire situation strongly or exclusively based on signal frequencies outside an engine frequency spectrum.

10. The device according to claim 1, wherein the device is further configured to perform the determination of the fire situation in a manner dependent on the noise signal of at least one of the following fluid state sensors: fresh-air mass sensor, charge pressure sensor, exhaust-gas counterpressure sensor.

11. The device according claim 1, further comprising a monitoring evaluation device for evaluating detected signals of the fluid state sensor, wherein the monitoring evaluation device is configured to activate at least one countermeasure if a fire situation is detected.

12. The device according to claim 11, wherein the at least one countermeasure comprises at least one of:
   a shut-off of a fuel supply,
   a flooding of the fluid conduit with inert gas, or
   a warning to a user of the fluid conduit.

13. The device according to claim 12, wherein the inert gas is EGR gas.

14. The device according to claim 12, wherein the user is a driver of a vehicle.

15. A controller for a motor vehicle having an internal combustion engine, the controller comprising the device according to claim 1.

* * * * *